(12) United States Patent
Cortigiano, Sr.

(10) Patent No.: US 6,895,725 B2
(45) Date of Patent: May 24, 2005

(54) METHOD AND APPARATUS FOR SEALING ZIPPERS TO BAG MAKING FILM

(75) Inventor: Ronald Cortigiano, Sr., Toccoa, GA (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/922,713

(22) Filed: Aug. 20, 2004

(65) Prior Publication Data

US 2005/0016126 A1 Jan. 27, 2005

Related U.S. Application Data

(62) Division of application No. 10/213,384, filed on Aug. 5, 2002, now Pat. No. 6,810,642.

(51) Int. Cl.⁷ ............................ B65B 61/18; B65B 9/06
(52) U.S. Cl. ................ 53/133.4; 53/139.2; 53/552; 493/213; 493/927
(58) Field of Search ............................ 53/133.4, 139.2, 53/550–552; 493/213, 214, 927

(56) References Cited

U.S. PATENT DOCUMENTS

| | | | | |
|---|---|---|---|---|
| 4,909,017 A | * | 3/1990 | McMahon et al. ............. 53/410 |
| 5,400,568 A | * | 3/1995 | Kanemitsu et al. ............ 53/412 |
| 6,017,412 A | * | 1/2000 | Van Erden et al. .......... 156/290 |
| 6,044,621 A | * | 4/2000 | Malin et al. .................. 53/412 |
| 6,099,451 A | * | 8/2000 | Mulder et al. ............... 493/214 |
| 6,131,369 A | * | 10/2000 | Ausnit .......................... 53/412 |
| 6,131,370 A | * | 10/2000 | Ausnit .......................... 53/412 |
| 6,138,439 A | * | 10/2000 | McMahon et al. ............. 53/412 |
| 6,167,597 B1 | * | 1/2001 | Malin .......................... 24/585.1 |
| 6,212,857 B1 | * | 4/2001 | Van Erden ................... 53/412 |
| 6,286,191 B2 | * | 9/2001 | Van Erden ................... 24/399 |
| 6,327,837 B1 | * | 12/2001 | Van Erden ................... 53/412 |
| 6,350,340 B1 | * | 2/2002 | Johnson ....................... 156/252 |
| 6,553,740 B2 | * | 4/2003 | Delisle ....................... 53/133.4 |
| 6,588,176 B1 | * | 7/2003 | Buchman ..................... 53/412 |
| 6,622,353 B2 | * | 9/2003 | Provan et al. ........... 24/585.12 |
| 6,662,843 B1 | * | 12/2003 | Johnson ....................... 156/519 |
| 6,840,897 B2 | * | 1/2005 | Knight ....................... 493/213 |

* cited by examiner

*Primary Examiner*—Stephen F. Gerrity
(74) *Attorney, Agent, or Firm*—Ostrager Chong Flaherty & Broitman P.C.

(57) ABSTRACT

An automated reclosable packaging manufacturing equipment for applying zipper tape to bag making film, especially as part of a form-fill-seal process, and a method of joining a zipper flange of a zipper assembly to bag making film without "seal-through" of the zipper flanges. The method comprises the steps of: (a) pressing a web of bag making film and first and second zipper flanges of a zipper assembly together along the length of the latter, with the first zipper flange sandwiched between and in contact with the web of bag making film and the second zipper flange; and (b) during step (a), causing heat to be conducted through the web of bag making film into the first zipper flange. The amount of heat conducted through the web of bag making film must be sufficient to seal the web of bag making film to the first zipper flange without sealing the first zipper flange to the second zipper flange.

11 Claims, 9 Drawing Sheets

METHOD AND APPARATUS FOR SEALING ZIPPERS TO BAG MAKING FILM

CROSS-REFERENCE TO RELATED APPLICATION

This application is a division of and claims priority from U.S. patent application Ser. No. 10/213,384 filed on Aug. 5, 2002, now U.S. Pat. No. 6,810,642.

BACKGROUND OF THE INVENTION

The present invention relates to methods and apparatuses for automated manufacture of reclosable plastic packages having a resealable closure, especially as part of a form, fill and seal process.

In the use of plastic bags and packages, particularly for foodstuffs, it is important that the bag be hermetically sealed until the purchaser acquires the product, takes it home, and opens the bag or package for the first time. It is then commercially attractive and useful for the consumer that the bag or package be reclosable so that its contents may be protected. Flexible plastic zippers have proven to be excellent for reclosable bags, because they may be manufactured with high-speed equipment and are reliable for repeated reuse.

A typical zipper comprises one fastener strip or closure member having a groove and attached to one side of the bag mouth, and another fastener strip or closure member having a rib and attached to the other side of the bag mouth, which rib may interlock into the groove when the sides of the mouth of the bag are pressed together. Alternatively, a fastener strip having a plurality of ribs may be on one side of the bag mouth, while a fastener strip having a plurality of grooves or channels may be on the other side, the ribs locking into the channels when the sides of the mouth of the bag are pressed together. In the latter case, there may be no difference in appearance between the two fastener strips, as the ribs may simply be the intervals between channels on a strip that lock into another of the same kind. In general, some form of male/female interengagement is used to seal the two sides of the bag mouth together. The fastener strips or closure members are bonded in some manner to the material from which the bags themselves are manufactured.

In the automated manufacture of plastic reclosable packages or bags, it is known to feed a zipper assembly to a position adjacent a sheet of thermoplastic film and then attach the zipper assembly to the bag by means of heat sealing. The zipper assemblies are attached at spaced intervals along the thermoplastic sheet, one zipper assembly being attached to each section of film respectively corresponding to an individual package or bag. The zipper assembly consists of two interlocking fastener strips that typically lie inside the mouth of the package. Each fastener strip preferably has a zipper flange that extends toward the product side of the package in a direction transverse to the line of the zipper. In accordance with one known method of feeding zipper assemblies to an automated form, fill and seal machine, the zipper assembly is in the form of a tape that is unwound from a spool for automated feeding. The tape comprises a continuous length of interlocked fastener strips. The continuous tape is fed to a cutting device that cuts the tape at regular lengths to form an individual zipper. Each individual zipper is then attached to the thermoplastic bag making film by heat sealing or other suitable means. Then the package is formed, filled and sealed on a form-fill-seal (FFS) machine.

Other types of reclosable plastic bags, however, contain a slider that facilitates a consumer opening and re-closing the package by disengaging and re-engaging the two sides of the zipper together. Slide-zipper assemblies are well known in the reclosable packaging art. Conventional slider-operated zipper assemblies typically comprise a plastic zipper having two interlocking profiles and a slider for opening and closing the zipper. In one type of slider-operated zipper assembly, the slider straddles the zipper and has a separating finger at one end that is inserted between the profiles to force them apart as the slider is moved along the zipper in an opening direction. The other end of the slider is sufficiently narrow to force the profiles into engagement and close the zipper when the slider is moved along the zipper in a closing direction. Other types of slider-operated zipper assemblies avoid the use of a separating finger. For example, U.S. Pat. No. 6,047,450 discloses a zipper comprising a pair of mutually interlockable profiled structures and having an A-shaped profile. Portions of the two profiled structures form a fulcrum about which the profiled structures may be pivoted when the slider forces lower edges of the bases towards each other. Above the fulcrum point, the interlocked male and female profiles disengage, thereby opening the zipper. The path of the slider as blocked at opposing sealed ends of the zipper halves by slider end stops, which are typically formed by ultrasonically stomping.

Whether or not the zipper assembly is opened and closed by a slider, the zipper flanges of the zipper assembly, when sealed to the bag making film, must not be sealed to each other. Such "seal-through" of the zipper flanges makes the bag difficult to open and susceptible to losing its reclosability, for example, if the bag film were to be torn during pulling apart of the sealed flanges.

Some techniques for avoiding "seal-through" of the zipper flanges include: inserting an insulating separator plate between the zipper flanges prior to heat sealing the flanges to the bag making film; and constructing the zipper flanges to have confronting layers of high-melting-point thermoplastic material that does not soften during sealing. The use of separator plates is suited more to instances where the zipper assembly is applied to the bag making film in the machine direction, since transverse application would require that the separator plate be repeatedly inserted between the zipper flanges and then retracted. The manufacture of zipper assemblies in which each flange comprises a layer of high-melting-point thermoplastic material laminated to a layer of low-melting-point thermoplastic sealant material is more costly than the manufacture of zipper assemblies without laminated flanges.

U.S. Pat. No. 6,327,837 discloses a zipper assembly having one flange longer than the other. In this case the zipper assembly is initially attached to the bag making film by sealing the portion of the long flange that extends beyond the short flange to the bag making film.

There is a need for an alternative method for automated application of zipper assemblies to bag making film without flange "seal-through".

BRIEF DESCRIPTION OF THE INVENTION

The present invention is directed to automated reclosable packaging manufacturing equipment for applying zipper tape to bag making film, especially as part of a form-fill-seal process. The invention is also directed to a method of joining a zipper flange of a zipper assembly to bag making film without "seal-through" of the zipper flanges.

One aspect of the invention is a method of making a zippered bag, comprising the following steps: (a) pressing a web of bag making film and first and second zipper flanges of a zipper assembly together along the length of the zipper assembly, with the first zipper flange sandwiched between and in contact with the web of bag making film and the second zipper flange; (b) during step (a), causing heat to be conducted through the web of bag making film into the first zipper flange, the amount of heat conducted through the web of bag making film being sufficient to seal the web of bag making film to the first zipper flange in a first seal without sealing the first zipper flange to the second zipper flange; (c) subsequent to step (b), folding the web of bag making film and sealing the folded web to form a bag having a mouth with the first seal disposed on and running the length of one side of the mouth; (d) pressing opposing walls of the bag and the first and second zipper flanges together along the length of the zipper assembly, with the second zipper flange sandwiched between and in contact with a folded-over portion of the web of bag making film and the first zipper flange; and (e) during step (d), causing heat to be conducted through the folded-over portion of the web of bag making film into the second zipper flange, the amount of heat conducted through the folded-over portion of the web of bag making film being sufficient to seal the folded-over portion of the web of bag making film to the second zipper flange in a second seal without sealing the first zipper flange to the second zipper flange. The second seal is disposed on and runs the length of the other side of the mouth of the bag.

Another aspect of the invention is a system for making a zippered bag comprising: first means for pressing a web of bag making film and first and second zipper flanges of a zipper assembly together along the length of the zipper assembly, with the first zipper flange sandwiched between and in contact with the web of bag making film and the second zipper flange; first means for causing heat to be conducted through the web of bag making film into the first zipper flange during pressing, the amount of heat conducted through the web of bag making film being sufficient to seal the web of bag making film to the first zipper flange in a first seal without sealing the first zipper flange to the second zipper flange; means for folding and sealing the web of bag making film with attached zipper assembly to form a bag having a mouth with the first seal disposed on and running the length of one side of the mouth; second means for pressing opposing walls of the bag and the first and second zipper flanges together along the length of the zipper assembly, with the second zipper flange sandwiched between and in contact with a folded-over portion of the web of bag making film and the first zipper flange; and second means for causing heat to be conducted through the folded-over portion of the web of bag making film into the second zipper flange, the amount of heat conducted through the folded-over portion of the web of bag making film being sufficient to seal the folded-over portion of the web of bag making film to the second zipper flange in a second seal without sealing the first zipper flange to the second zipper flange. The second seal is disposed on and runs the length of the other side of the mouth of the bag.

A further aspect of the invention is a method of making reclosable bags having a zipper assembly comprising first and second profiled closure members, and first and second zipper flanges respectively connected to the first and second closure members and extending generally parallel therefrom. The method comprises the following steps: (a) placing one side of the zipper assembly in contact with a length of bag making film, a first portion of the first zipper flange having one side confronting a first portion of the length of bag making film and the other side confronting a first portion of the second zipper flange; (b) sealing the first portion of the first zipper flange to the first portion of the length of bag making film while the first portion of the first zipper flange and a first portion of the second zipper flange are in contact, thereby forming a first seal without sealing the second zipper flange to the first zipper flange; (c) making the length of bag making film into a receptacle having a mouth, wherein the first portion of the length of bag making film forms one half of the mouth and a second portion of the length of bag making film, generally opposite to the first portion, forms the other half of the mouth; and (d) sealing a second portion of the second zipper flange to the second portion of the length of bag making film while the second portion of the second zipper flange is in contact with a second portion of the first zipper flange, thereby forming a second seal without sealing the second zipper flange to the first zipper flange. The first seal is produced by heat that is conducted through the first portion of the length of bag making film and then into the first zipper flange, and the second seal is produced by heat that is conducted through the second portion of the length of bag making film and then into the second zipper flange.

Another aspect of the invention is a system for manufacturing reclosable bags comprising: a vertical form-fill-seal (VFFS) machine for forming, filling and sealing a reclosable bag, comprising a forming collar, a fill tube and sealing means; a roll of bag making film comprising a wound portion and an unwound portion, the unwound bag making film extending from the wound portion of the roll to the forming collar and through the vertical FFS machine; opposing grooved elements comprising grooves designed to hold interlocked first and second closure members of a zipper assembly while first and second zipper flanges of the zipper assembly project in a forward machine direction, the first zipper flange being disposed between unwound bag making film and the second zipper flange; first and second sealing bars arranged in opposition at a first sealing station with the first sealing bar above the second zipper flange and the second sealing bar below the unwound bag making film; means for moving the first and second sealing bars between respective extended positions and respective retracted positions, the first and second zipper flanges and a first portion of unwound bag making film being pressed between the first and second sealing bars in their respective extended positions; first control means for heating the second sealing bar while in its extended position, the first sealing bar being unheated while in its extended position, and the second sealing bar being heated to a degree that the first zipper flange is sealed to the first portion of unwound bag making film without the first zipper flange being sealed to the second zipper flange; and means for advancing the bag making film with the zipper assembly attached thereto from the first sealing station to the sealing means of the VFFS machine.

Yet another aspect of the invention is a method of sealing a zipper assembly to bag making film, the zipper assembly comprising first and second profiled closure members that are mutually interlockable, and first and second zipper flanges respectively connected to the first and second profiled closure members and projecting generally parallel to each other when the first and second profiled closure members are interlocked. The method comprises the following steps: (a) pressing a web of bag making film and the first and second zipper flanges of the zipper assembly together along the length of the latter, with the first zipper flange sandwiched between and in contact with the web of bag making film and the second zipper flange; and (b) during step (a), causing heat to be conducted through the web of bag making film into the first zipper flange, the amount of heat conducted through the web of bag making film being sufficient to seal the web of bag making film to the first zipper flange without sealing the first zipper flange to the second zipper flange.

Other aspects of the invention are disclosed and claimed below.

DETAILED DESCRIPTION OF THE INVENTION

The present invention can be utilized in conjunction with many different methods of packaging product in a reclosable plastic bag. In particular, the invention has application in automated lines or machines which form a package, fill it with product, and then seal the product inside the package using any one of the known form-fill-seal (FFS) methods, such as HFFS (horizontal form-fill-seal), VFFS (vertical form-fill-seal) with the zipper applied in either the machine or transverse direction, or HFVFS (horizontal form/vertical fill-seal). In general, the conventional methods of packaging product in reclosable packaging using a form, fill and seal automated process comprise the following steps: attaching one zipper assembly to the bag making film for each package length interval; forming the bag making film into successive packages, each package having a respective zipper assembly; filling each package with product; sealing each filled package, and then separating the filled package from the bag making film. The zipper assembly can be oriented in either a machine direction or a transverse (cross) direction when attached to the bag making film. The present invention is directed to a method and an apparatus for sealing the zipper flanges of a zipper assembly, with or without a slider, to bag making film in the course of an automated reclosable packaging operation.

In a typical form-fill-seal operation, a continuous supply of thin bag-making film is paid off of a supply reel by a suitable mechanism. For example, the FFS machine may be provided with feed drive rollers for pulling the film through the FFS machine. For each length of bag making film corresponding to an individual package, a zipper assembly is attached to the film. The zipper may be laid directly on the film, but preferably is fed laterally across the upper surface of the film at right angles to the longitudinal edges of the film, or in other words at right angles to the longitudinal formation axis of the film. The zipper assembly is cut off from the end of a zipper tape that is paid out from a zipper tape supply reel and guided to a sealing and cutting station, where an individual zipper is cut and sealed to the bag making film. The length of the zipper strip will be less than one-half of the film width. The lateral portions of the film beyond the ends of the attached zipper are sufficiently long so that they can eventually be folded over and sealed to the other zipper flange.

The foregoing automated process becomes more complex when zipper assemblies with sliders are used as the reclosable plastic fastening means. The machinery for feeding the slider-zipper assemblies to the desired position overlying the thermoplastic film must take account of the different profile and larger dimensions of the slider as compared to the profile and dimensions of the interlocked fastening members of the zipper.

Figure 1:
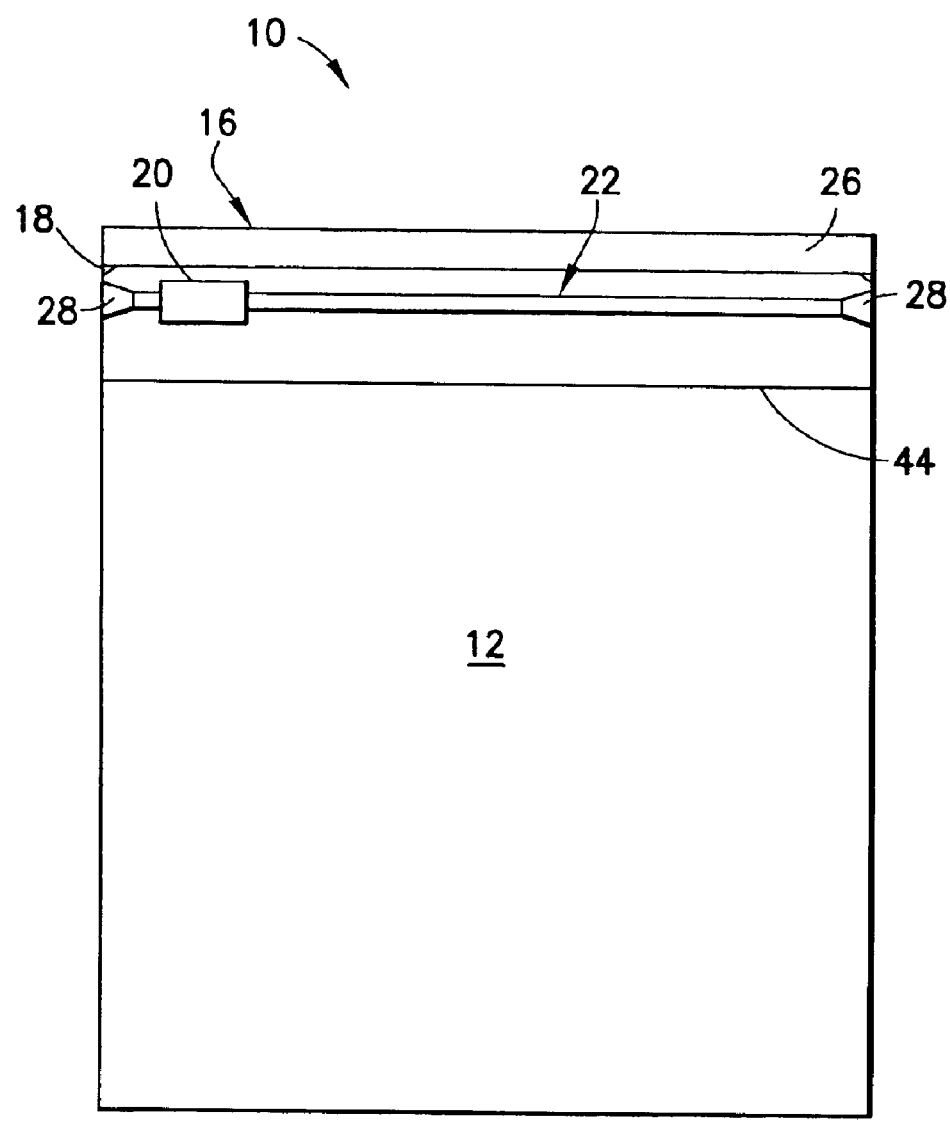
FIG. 1 is a drawing showing a front view of a conventional reclosable package having a slider-zipper assembly installed in the mouth of the package.

Reference will now be made to the drawings in which similar elements in different drawings bear the same reference numerals. FIG. 1 depicts a reclosable package 10 comprising a receptacle with a mouth at the top, the receptacle being formed by a front wall 12 and a rear wall (not shown) that is opposite to the front wall. The front and rear walls are typically formed from clear thermoplastic film heat sealed as necessary to form hermetically sealed junctures for the various portions of the package, e.g., along the sides if folded along the bottom or along a central seam and along the bottom if folded along the sides. A zipper 22 comprising a pair of fastener strips having respective interlockable profiled closure members is provided in the mouth of the receptacle, attached to the front wall 12 and the rear wall (not visible in FIG. 1). A slider 20 is provided on the zipper to facilitate its opening and closing. FIG. 1 shows the slider 20 in a position corresponding to closure of the zipper 22. Moving the slider 20 toward the right-hand side would disengage the interlockable closure members of the zipper and moving the slider back to the closed position shown in FIG. 1 would bring the interlockable closure members of the zipper into full engagement once again. For proper functioning, the interlockable members have spot seals or ultrasonic stomps 28 at the ends of the zipper strips. These seals ensure the zipper strips will not come apart during use and provide end stops for stopping the slider 20.

Prior to opening of the package by the consumer, the slider-zipper assembly may be covered on the consumer side by an enclosed header 16 that is hermetically sealed. The sealed header 16, which provides a tamper-evident feature, comprises front and rear panels that may be integrally formed with or heat sealed to the front and rear walls, respectively, of the receptacle. The numeral 26 in FIG. 1 designates a hard seal, i.e., a seal that is not intended to be broken, at the top of the header. Alternatively, the opposed header panels may be formed by folding a piece of film and attaching the ends to the walls of the receptacle. The sealed header 16 preferably has respective tear notches 18 formed on each side edge of the header, where the consumer can initiate tearing off of the sealed header from the package.

It should be appreciated that the front wall of the header 16 and the front wall 12 of the receptacle are shown in FIG. 1 as being made of relatively transparent thermoplastic material. Therefore, the slider-zipper assembly is visible through the clear walls and has not been depicted as hidden.

Figure 2:
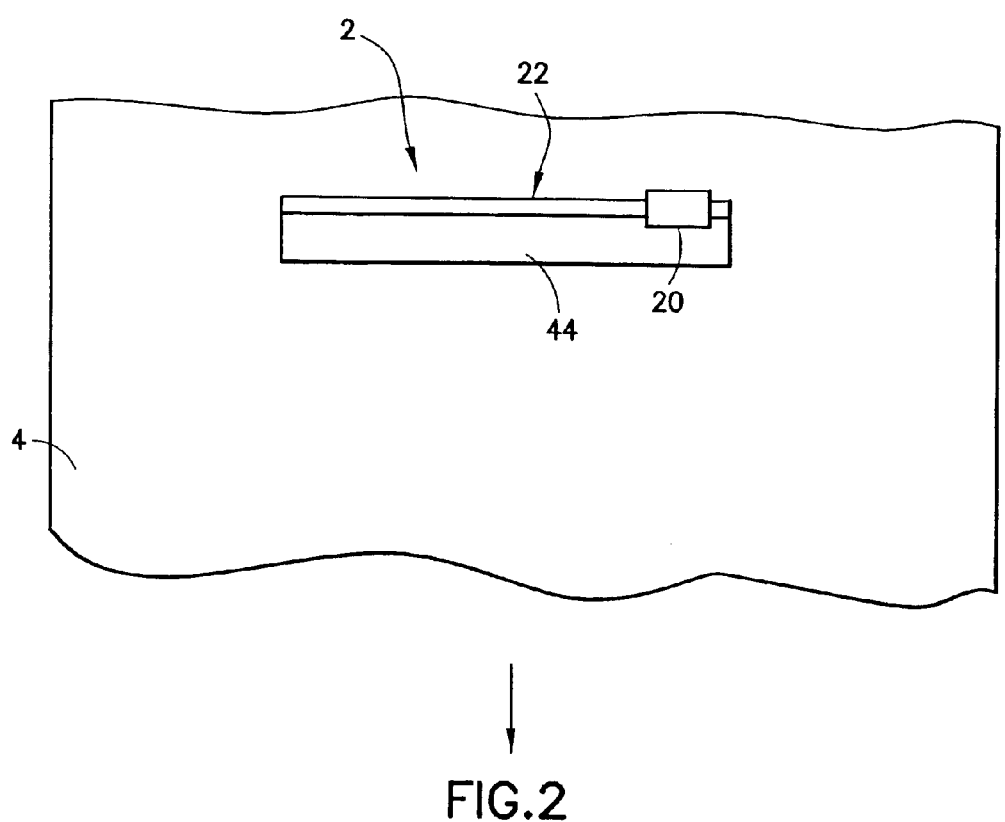
FIG. 2 is a drawing showing a fragmentary top view of a slide-zipper assembly attached to a tensioned bag making film and oriented in a transverse direction.

FIG. 2 depicts thermoplastic bag making film 4 with a slider-zipper assembly 2 applied transverse to the machine direction. The slider-zipper assembly 2 comprises a slider 20 and a zipper assembly 22. Preferably the slider-zipper assembly is cut off from the end of a tape or chain of such assemblies, fed transversely to the position shown in FIG. 2, and then heat sealed to the thermoplastic film by the apparatus depicted in FIG. 3.

Figure 3:
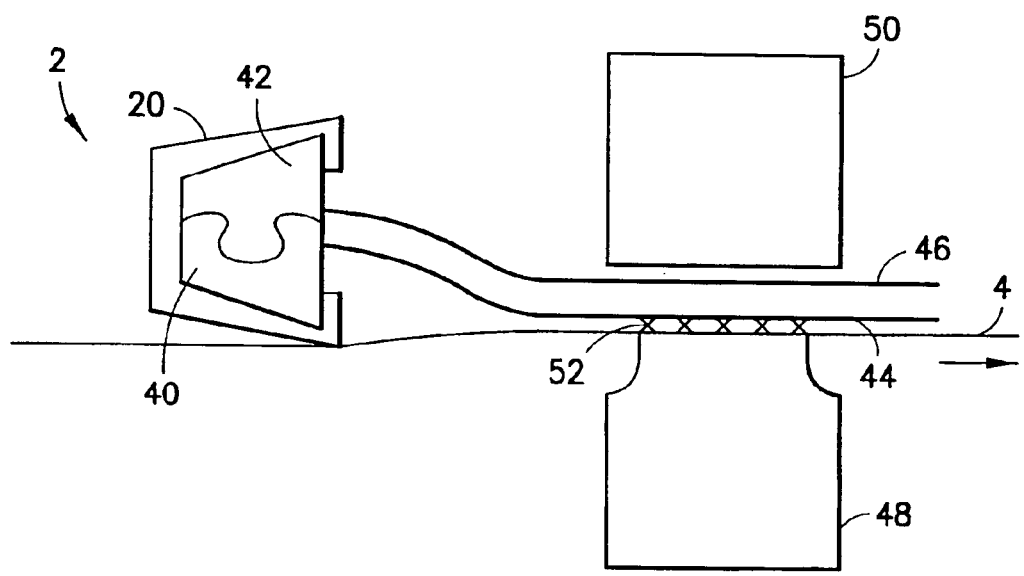
FIG. 3 is a drawing showing a side view of the first sealing operation in accordance with one embodiment of the invention, whereby one flange of a slider-zipper assembly is sealed to a web of bag making film.

As best seen in FIG. 3, the zipper assembly comprises a closure member 40 having a female profile and a zipper flange 44 having one end connected to the closure member 40; and a closure member 42 having a male profile and a zipper flange 46 having one end connected to the closure member 42. The zipper flanges 44 and 46 extend in the machine direction when laid on the bag making film 4, generally parallel to each other. The zipper flange 44 is attached to the stationary film 4 at the first sealing station depicted in FIG. 3. The arrow in FIGS. 2 and 3 indicates the direction of film advancement after the zipper assembly has been attached to the film. The first sealing station comprises a heated lower sealing bar 48 and an unheated upper sealing bar or bed 50, both of which move in opposite directions between extended and retracted positions. In the extended positions, the lower sealing bar 48 and upper sealing bed 50 press the zipper flanges 44 and 46 together and heat from the heated lower sealing bar 48 is conducted through the film 4 and into the zipper flange 44, forming a permanent seal 52 therebetween. The temperature of the lower sealing bar 48 is controlled by a programmable heat controller (not shown). The dwell time of the lower sealing bar in the extended position is controlled by a programmable controller (not shown). Both controllers are programmed to produce conditions at the first sealing station such that zipper flange 44 is sealed to film 4 without sealing zipper flange 44 to zipper flange 46.

A tape transfer assembly guides the zipper assembly into the position shown in FIG. 2 and holds the zipper assembly in place while the sealing operation depicted in FIG. 3 is performed. The tape transfer assembly is shown in detail in FIGS. 4–7. The zipper tape with sliders is fed from a tape drive assembly (not shown) to the tape transfer assembly. In the front view of FIG. 4, the terminal section of the zipper tape is shown in a position between a bank of drive roller assemblies 76, 78, 80 and a fixed shelf 75. The slider 20 of the terminal zipper length sits atop the shelf 75 at a position to the right of the large drive roller 76. The slider cannot not pass under the drive rollers. It should be appreciated that the zipper tape extends in the right-hand direction, where it passes through the tape drive assembly. The zipper tape enters the tape transfer assembly from right to left in FIG. 4. In the position shown in FIG. 8, the zipper tape is cut and the cut zipper length is sealed to bag making film that extends in a plane perpendicular to the sheet and passes directly below the shelf 75. The cutting mechanism is not shown.

Figure 6:
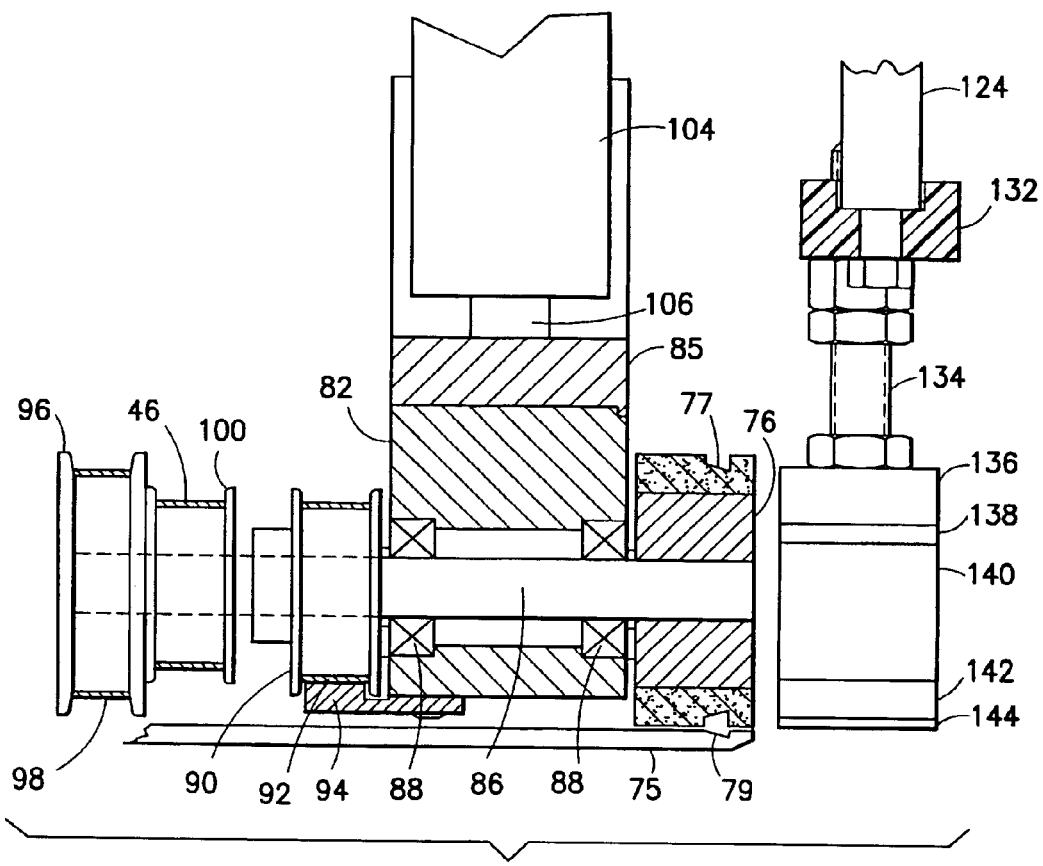
FIG. 6 is a drawing showing a sectional view of the zipper tape transfer assembly shown in FIG. 4, the section being taken along line 6—6 indicated in FIG. 4.

As seen in FIG. 6, the shelf has a V-shaped longitudinal groove 79, while the large drive roller assembly 76 has a circumferential groove 77 with a generally trapezoidal profile. Each of small drive rollers 78 has a similar circumferential groove. These circumferential grooves on the drive roller assemblies are generally aligned with the longitudinal groove 79 of the shelf 75. At the nip where each drive roller nearly contacts the shelf 75, the peripheral grooves 77 and the longitudinal groove 79 form respective passageways for the A-shaped zipper profile. Although not shown in FIG. 6, the zipper flanges of the zipper assembly extend rightward, through the gap between the shelf 75 and roller 76 and beyond the edge of the shelf, where the bottom flange will be sealed to the bag making film.

Figure 5:
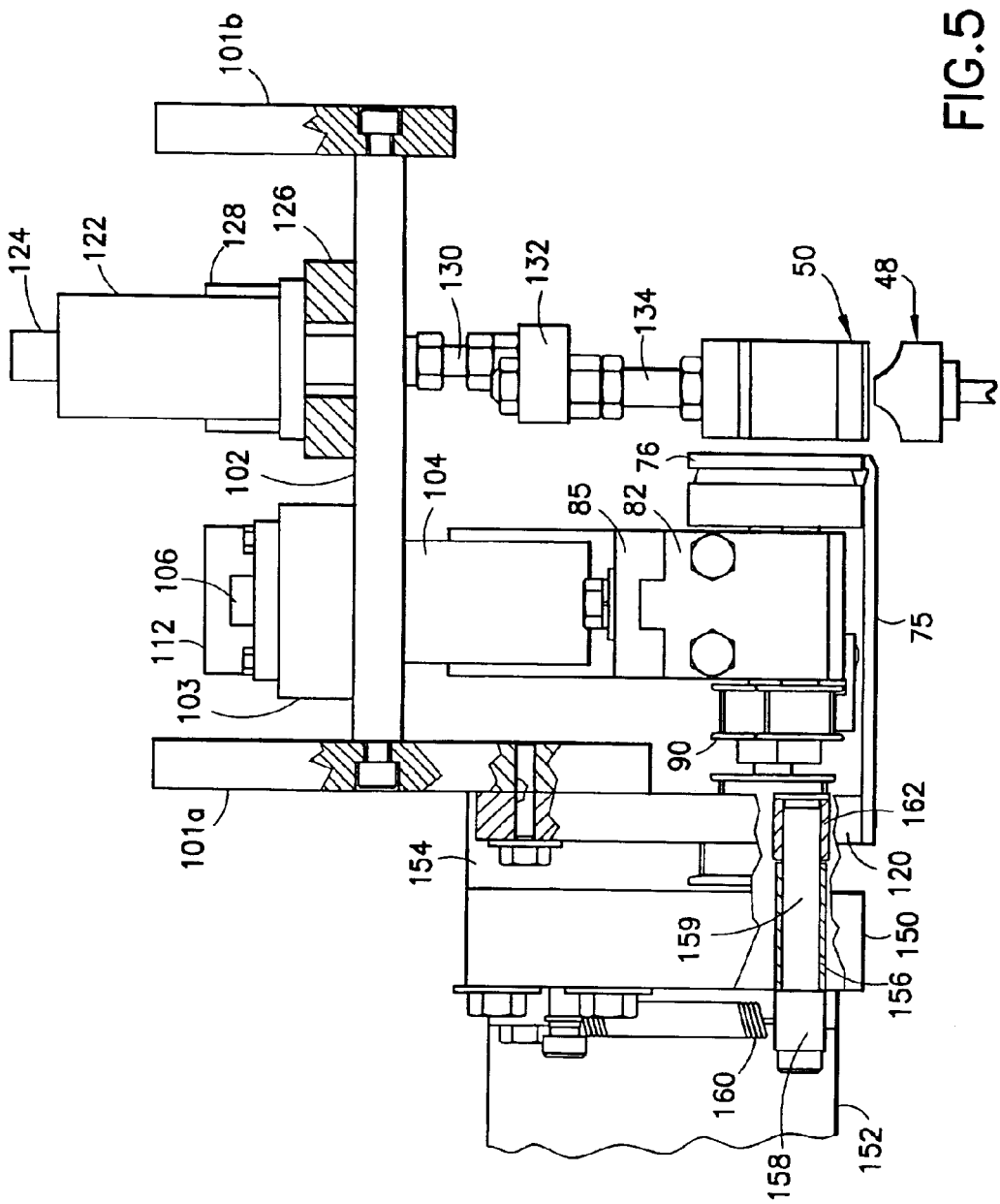
FIG. 5 is a drawing showing a side view of the zipper tape transfer assembly shown in FIG. 4 (without the slider-zipper assembly) and the first sealing station in accordance with the disclosed embodiment.

Still referring to FIG. 6, the drive roller assembly 76 comprises a metal core surrounded by an annular ring made of silicone. The circumferential groove is formed in the annular ring of silicone. The other drive roller assemblies (i.e., items 78 and 80) have a similar construction. The metal core of the drive roller 76 is mounted to one end of a horizontal shaft 86. The shaft 86 is rotatably supported by a pair of bearings 88. The bearings 88 are mounted in a pulley mounting plate 82. The other drive assemblies are also mounted to the end of respective horizontal shafts rotatably supported by respective sets of bearings mounted in the pulley mounting plate 82. Shaft 86, however, differs from the other shafts in that shaft 86 is longer and carries, on its opposite end, a gearbelt pulley 96 that is coupled to a servomotor by a gearbelt 98 and a gearbelt pulley 100 that is coupled to a gearbelt pulley of the tape drive assembly (not shown) by a gearbelt 46. Thus, the servomotor (152 in FIG. 5) drives the rotation of shaft 86 and drive roller assembly 76 mounted thereon. Referring to FIG. 5, the motor 152 is attached to the fixed support frame by means of a motor mounting plate 150 and motor space 154.

The rotation of shaft 86 also drives the rotation of the other drive roller assemblies 78 and 80 of the tape transfer assembly. As seen in FIG. 6, a gearbelt pulley 90 is mounted on shaft 86. The gearbelt pulley 90 and the drive roller assembly 76 are mounted on shaft 86 on opposite sides of the pulley mounting plate 82. Similarly, the other shafts, on which the other drive roller assemblies 78 and 80 are mounted, also have gearbelt pulleys aligned with gearbelt pulley 90 and coupled to gearbelt pulley 90 by means of a gearbelt 92. The gearbelt 92 is retained against the gearbelt pulley 90 by a drive belt retainer 94. Moreover, each gearbelt pulley driven by gearbelt 92 also has a respective drive belt retainer (not shown).

Figure 7:
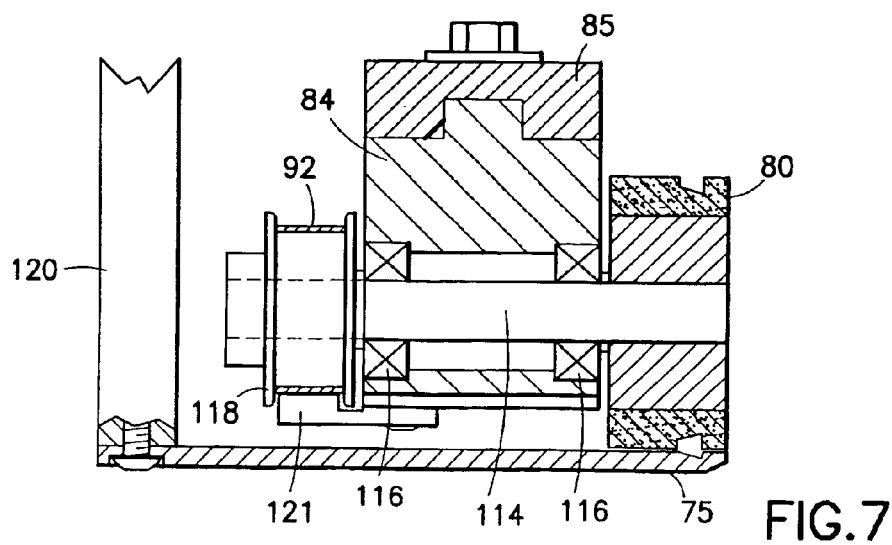
FIG. 7 is a drawing showing another sectional view of the zipper tape transfer assembly shown in FIG. 4, this section being taken along line 7—7 indicated in FIG. 4.

FIG. 7 shows a similar arrangement for drive roller assembly 80, which is mounted to one end of a shaft 114 rotatably supported by bearings 116. A gearbelt pulley 118 is mounted to the other end of the shaft 114. Pulley 118 is coupled to pulley 90 (shown in FIG. 6) by the gearbelt 92, which is held against pulley 118 by a drive belt retainer 121. As seen in FIG. 7, the shelf 75 is fastened to a shelf mounting plate 120 and extends in cantilevered fashion to a location underneath the bank of drive roller assemblies. Although not shown in FIG. 7, the shelf mounting plate 120 is a vertical plate that overlaps and is fastened to a vertical bearing plate 101a (best seen in FIG. 5).

Referring again to FIG. 4, the position of drive roller assembly 80 is adjustable along the axis of a screw 81. More specifically, the drive roller assembly 80 is rotatably mounted to adjustment pulley mount 84, which translates along the screw axis as screw 81 is turned. This facilitates the installation and tightening of gearbelt 92. The gearbelt 92 ensures that the peripheral points of contact with the zipper of all drive roller assemblies move at the same tangential velocity.

Figure 4:
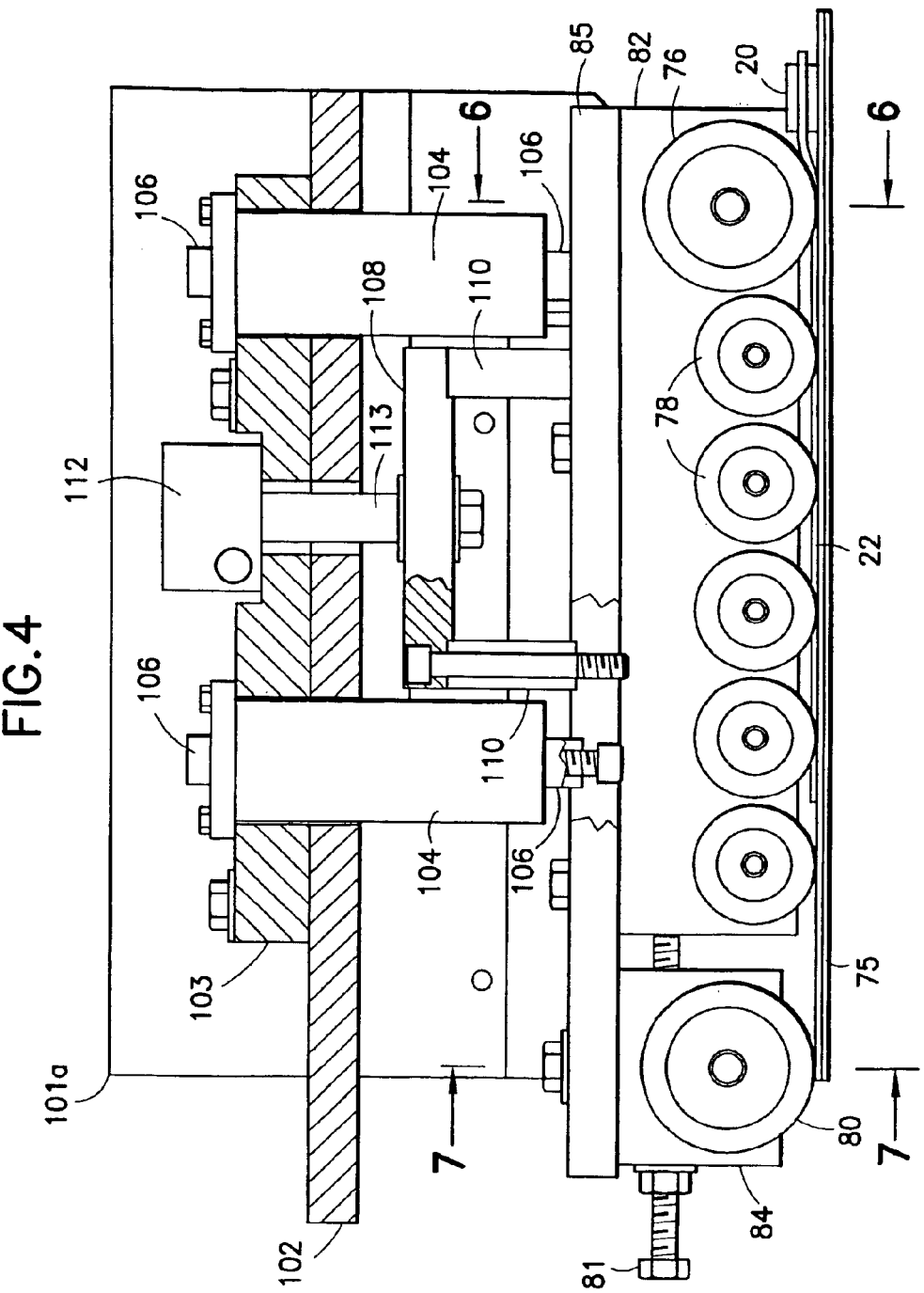
FIG. 4 is a drawing showing a front view (partially sectioned) of a zipper tape transfer assembly with a slider-zipper assembly in accordance with one embodiment of the invention.

As previously mentioned, the peripheral surface of each drive roller is made of silicone to prevent slippage of the plastic zipper tape during transfer of the zipper tape in a direction transverse to the running direction of the bag making film. The non-slipping contact of the periphery and groove of the drive rollers with the zipper tape during roller rotation in a clockwise direction (as seen in FIG. 4) pulls the zipper tape from right to left in FIG. 4. Transverse transfer of the zipper tape is stopped before the slider 20 contacts drive roller assembly 76. In this position, the zipper tape is cut and sealed to the bag making film. More specifically, while the drive rollers and shelf 75 restrain the closure members of the zipper assembly, the zipper flanges extend between the confronting faces of the sealing bar 48 and sealing bed 50, which are shown in confronting relationship without the zipper assembly in FIG. 5.

The sealing bar 48 is located below the tensioned bag making film while the sealing bed 50 is located above the tensioned film. They move in opposite directions between respective extended and retracted positions. The zipper flange 44 is sealed to the film 4 when the bar 48 and bed 50 are in their respective extended positions.

Referring now to FIG. 5, two bearing plates 101*a* and 101*b*, a horizontal mounting plate 102 fastened therebetween, and the shelf mounting plate 120 fastened to plate 101*a* form parts of a fixed support structure. A retractable sealing bed 50 is mounted to the horizontal mounting plate 102 in the following manner. The sealing bed 50 is suspended from a vertically displaceable seal bar mounting plate 132 via a pair of threaded rods 134, only one of which is visible in FIG. 5. The seal bar mounting plate 132 is in turn fastened to the ends of a pair of guide shafts 124 (only one of which is visible in FIGS. 5 and 6), which are in turn respectively supported for vertical displacement by a pair of flanged mount bearings 122 (only one of which is visible in FIG. 5). The flanged mount bearings 122 sit atop and are fastened to a horizontal cylinder mounting plate 126, which sits on and is fastened to horizontal mounting plate 102. The force for lifting the sealing bed 50 is provided by an air cylinder 128 having a piston 130, the end of which is fastened to the middle of the seal bar mounting plate 132.

Referring to FIG. 6, the retractable bed in turn comprises the following stack of elements: a seal bar core 136; a heat insulator 138; a platen bar 140; a ¼-inch-thick layer of silicone rubber 142; and a ⅛-inch-thick layer of silicone rubber 144 covered with Teflon glass cloth, which contacts the zipper flange during sealing. The silicone rubber conforms to the shape of the compressed zipper flange 44 in contact therewith and facilitates the formation of a uniform permanent seal between the film 4 and the zipper flange 46.

Figure 8:
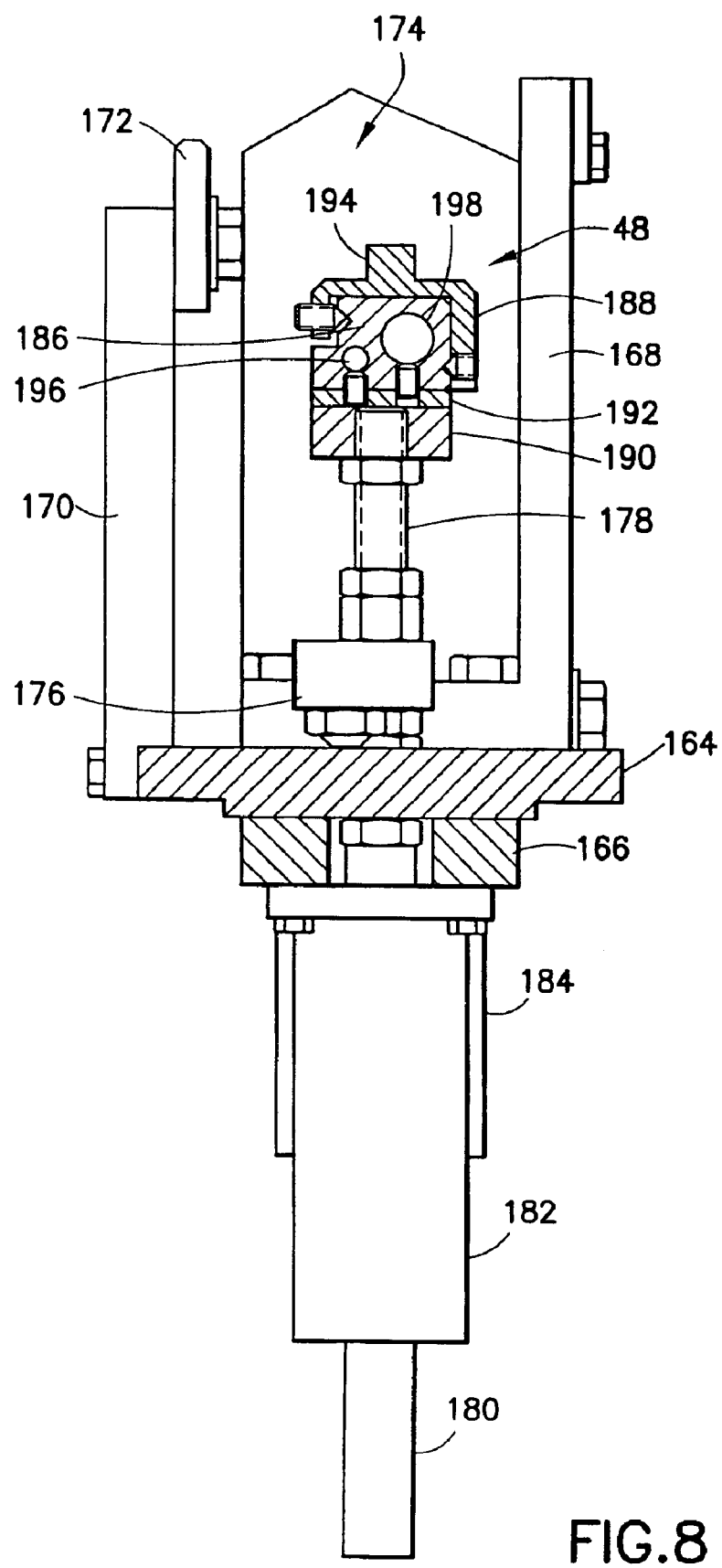
FIG. 8 is a drawing showing a sectional view of the lower seal bar assembly at the first sealing station.

The sealing bar 48 is a part of a lower sealing bar assembly shown in detail in FIG. 8. This assembly is supported by a series of connector plates (not shown) to a support frame. More specifically, a slider plate 164 is mounted to the distal portion of the last connector plate (not shown). A cylinder mounting plate 166 is in turn mounted to the slider plate 164. Item 168 in FIG. 8 is a curtain mount, while item 174 represents a portion of one of the aforementioned connector plates. Item 170 is one of two film support arms, the bottom ends of which are fastened to opposing ends of the sealing bar mounting plate 164. A horizontal film support member 172 extends transversely underneath the bag making film and is fastened to the top ends of the film support arms 170. When the lower sealing bar 48 retracts, the stationary horizontal member 172 engages the bag making film and supports it vertically, thereby disengaging the film from the sealing bar in the event that the film sticks to the heated surface of the bar.

The sealing bar 48 is mounted to vertically displaceable seal bar mounting plate 176 via a pair of threaded rods 178, only one of which is visible in FIG. 8. The seal bar mounting plate 176 is in turn fastened to the ends of a pair of guide shafts 180 (only one of which is visible in FIG. 8), which are in turn respectively supported for vertical displacement by a pair of flanged mount bearings 182 (only one of which is visible in FIG. 5). The flanged mount bearings 182 sit atop and are fastened to cylinder mounting plate 166, which sits on and is fastened to slide plate 164. The force for lifting the sealing bar 48 is provided by an air cylinder 184 having a piston (not visible in FIG. 8) the end of which is fastened to the middle of the seal bar mounting plate 164.

The sealing bar 48 is an assembly comprising a seal bar core 186, a seal bar cap 188 having a sealing bar 194 projecting therefrom, a seal bar cap 190, and an insulator 192. The seal bar cap 188 caps the seal bar core 186. The insulator 192 is sandwiched between the seal bar core 186 and the seal bar cap 190. The seal bar cap 190 is fastened to the ends of the threaded rods 178. The seal bar core 186 has a pair of longitudinal channels that respectively house a thermocouple 196 and an electric heater 198, both of which are electrically connected to a programmable heat controller (not shown) by electrical wiring (not shown). The thermocouple produces electrical signals representing the temperature of the seal bar core 186, which signals are received by the heat controller. The heat controller controls the level of electrical current supplied to the heater 198 in accordance with a heat control program that is designed to maintain the sealing bar temperature within limits preset by the system operator. In particular, the temperature of the sealing bar must be selected such that the amount of heat conducted through the bag making film and into the adjoining zipper flange, during the time that the zipper flanges and film are pressed between the extended sealing bar and sealing bed, will achieve the desired result, namely, sealing of one zipper flange to the bag making film without "seal-through" of the zipper flanges.

After each slider-zipper assembly has been attached to the bag making film along a band (i.e., permanent seal 52) transverse to the running direction of the film, the film with slider-zipper assembly must be advanced by one package length. With reference to the drawings, the bag making film will be advanced in a direction directed out of the page in FIG. 4 and from left to right in FIG. 5. However, as seen in FIG. 6, the opposing grooves 77 and 79 form a passageway for receiving the A-shaped zipper profile while the gap to the right, through which the zipper flanges project, is too narrow to allow the A-shaped zipper profile to pass through during bag making film advancement. This problem is solved by providing means for lifting the drive roller assemblies upward and away from the stationary shelf 75.

Referring to FIG. 4, the drive roller assemblies are rendered vertically retractable by mounting them to a vertically displaceable mounting plate 85. More specifically, the pulley mounting plate 82, which supports the drive roller assemblies 76 and 78 directly and the drive roller assembly 80 indirectly (via screw 81), is fastened to the mounting plate 85. The mounting plate 85 is fastened to the ends of a pair of guide shafts 106, which are in turn respectively supported for vertical displacement by a pair of flanged mount bearings 104. The flanged mount bearings 104 are fastened to a horizontal mounting plate 103, which sits on and is fastened to another horizontal mounting plate 102. The mounting plates 102, 103 also form part of the aforementioned fixed support structure. The horizontal mounting plate 102 spans and is supported by a pair of vertical bearing plates 101*a* and 101*b*, shown in FIG. 5. The bearing plate 101*a* depicted in FIG. 5 has the previously mentioned shelf mounting plate 120 fastened thereto. The flanged mount bearings 104 extend downward through respective sets of aligned apertures in the mounting plates 102 and 103. The axes of the guide shafts 106 are mutually parallel and directed vertically. This arrangement allows the entire carriage comprising the mounting plate 85, the pulley mounting plate 82, the drive roller assemblies 76, 78, 80, the gearbelt pulleys, and associated shafts, bearings, and belt retainers to be displaced vertically. Each of the drive rollers is separated from the shelf by a respective first gap when the carriage is in a fully extended position, this first gap being less than the width of the zipper profile, e.g., 0.020 inch. Each drive roller is separated from the shelf by a respective second gap when the carriage is in a fully retracted position, this second gap being greater than the zipper profile width, thereby providing sufficient clearance for the zipper profile to exit the tape transfer assembly when the bag making film, to which the zipper is now sealed, is advanced.

The force for lifting the carriage is provided by an air cylinder 112 having a piston 113, the end of which is fastened to a pressure plate 108. Alternatively, a hydraulic cylinder could be used. The pressure plate 108 is fastened to the mounting plate 85, the distance between plates 85 and 108 being determined by a plurality of stand-offs 110. The air cylinder 112 is mounted to the mounting plate 103. Aligned apertures in the mounting plates 102 and 103 allow passage of the piston 113. Actuation of the air cylinder is controlled by the same programmable controller that controls the servomotor 152. The programmable controller causes the drive roller assemblies to be lifted just prior to advancement of the bag making film, which is typically under the control of a separate programmable controller.

Although FIG. 6 does not show the zipper, the person skilled in the art will readily understand that the zipper profile will be captured between grooves 77 and 79 and the zipper flanges will extend to the right, through the gap between drive roller assembly 76 and shelf 75. After the bottom zipper flange has been sealed to the top of the bag making film, which passes under shelf 75, the carriage is lifted and then the bag making film is advanced. A tensioner arm 158 (see FIG. 5) maintains tension in the drive belt when the carriage is lifted. Item 156 is a spacer; item 162 is a needle roller bearing; and item 159 is a shoulder screw. Extension spring 160 is coupled to the tensioner arm 158. When the drive roller assembly 76 is raised, groove 77 no longer interferes with rightward movement of the zipper profile as the bag making film (which the zipper is now attached to) moves to the right. Also, the groove 79 in shelf 75 is formed with a surface that is inclined to facilitate the zipper profile leaving groove 79 without the lower lip of the zipper profile catching in the groove. After the bag making film has been advanced one package length, the carriage is lowered and the next zipper length is pulled into the flange sealing position by the drive roller assemblies.

Figure 9:
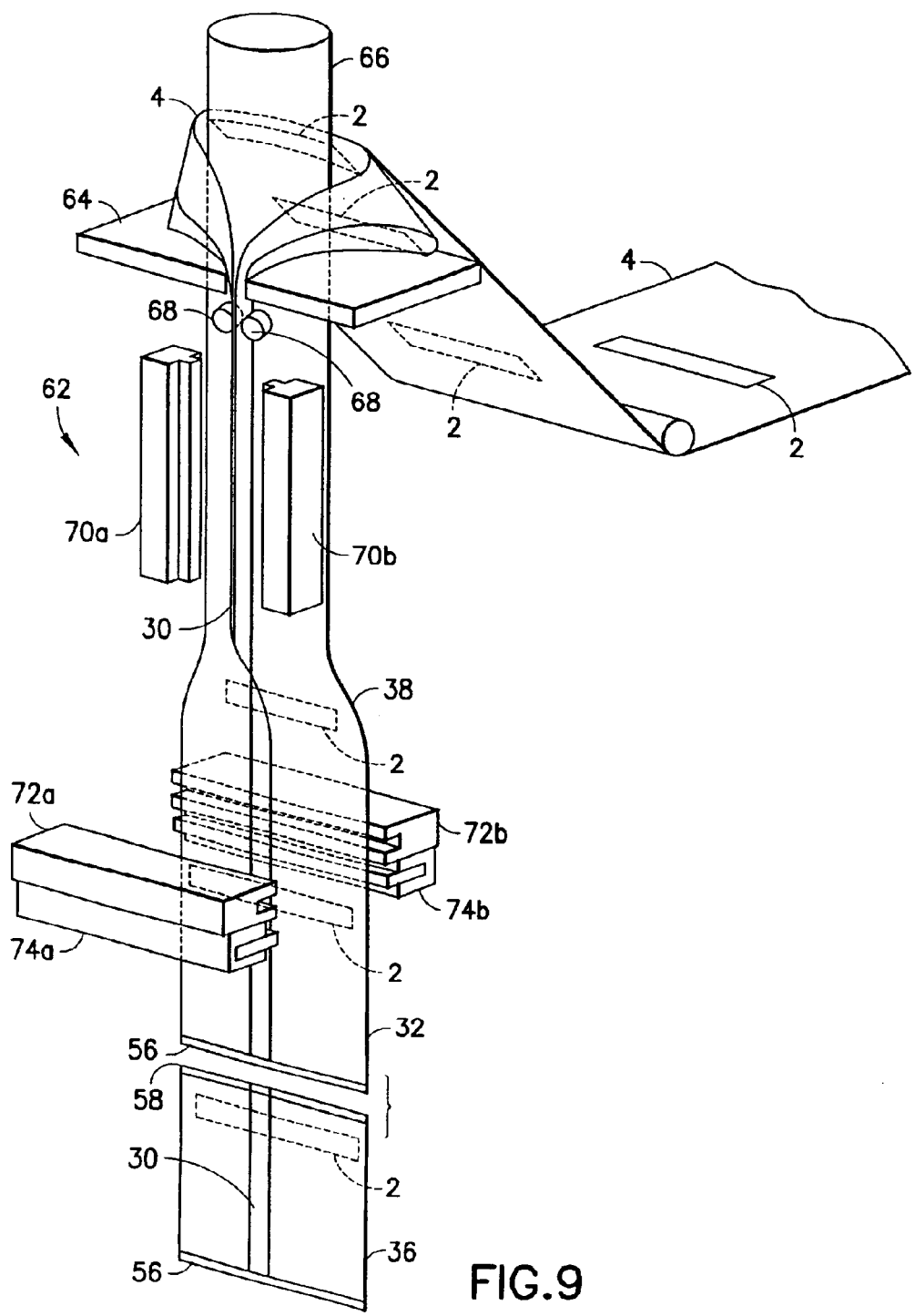
FIG. 9 is a drawing showing an isometric view of a form-fill-seal machine with a second sealing station installed below the fill tube in accordance with the disclosed embodiment.

In accordance with one embodiment of the invention, the bag making film 4 with slider-zipper assemblies 2 attached at intervals therealong is fed to a VFFS machine 62 (shown in FIG. 9). The thermoplastic film 4 is fed downwardly over a forming collar 64 and is folded around a filling tube 66. The edges of the film are brought together and pressed by a pair of rollers 68. These edges of the film are then sealed together by a pair of opposing longitudinal sealing bars 70a and 70b to form a longitudinal fin seal 30. Contents are then dropped through the tube 66 into the bag 32 that is currently being made. At the time of filling, bag 32 has a bottom seal 56 that was formed when the immediately preceding bag 36 was completed by making a top seal 58. After filling, the top of the instant bag 32 and the bottom of the next succeeding bag 38 are sealed by the action of cross sealing jaws 72a and 72b. At the same or about the same time, the second zipper flange is sealed to the adjoining wall of the bag 32 by a pair of opposing cross sealing bars 74a and 74b, which are respectively mechanically linked to the cross sealing jaws 72a and 72b. The mechanically linked jaws 72 and bars 74 perform four functions concurrently or nearly concurrently, which will now be described with reference to FIG. 10.

Figure 10:
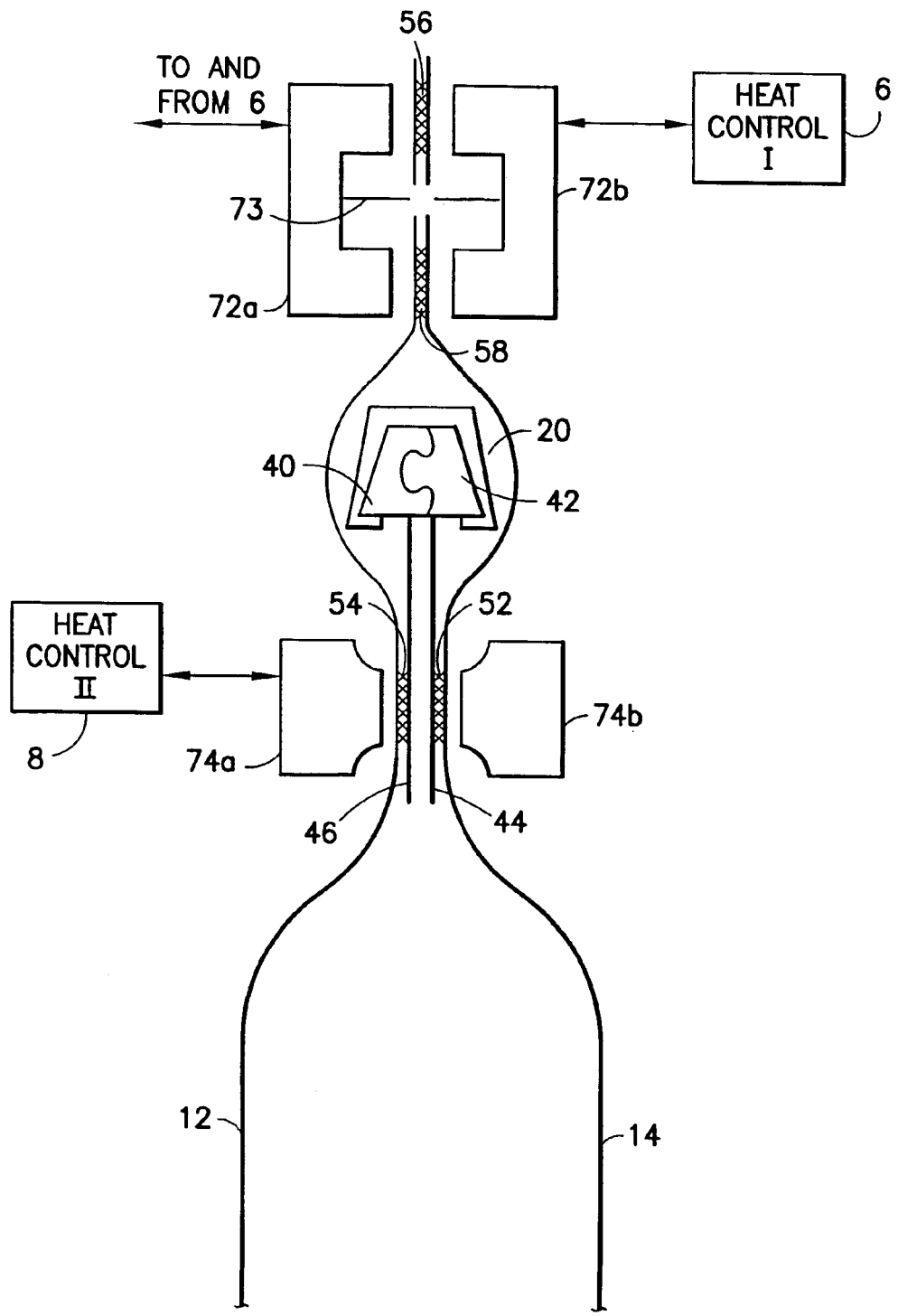
FIG. 10 is a drawing showing a side view of the second sealing station with the other flange of the slider-zipper assembly sealed to the opposing bag wall in accordance with the disclosed embodiment.

FIG. 10 shows the second sealing station, comprising cross sealing jaws 72 and cross sealing bars 74, in more detail. The mechanical linkages between jaws 72 and bars 74 are not shown. Each cross sealing jaw 72a and 72b comprises a respective pair of mutually parallel sealing bars, the sealing bars of jaw 72a being aligned with and opposed to the respective sealing bars of jaw 72b. Both cross sealing jaws 72a and 72b are heated to a temperature that causes the opposing walls 10 and 12 of the bag making film to seal together during a preset dwell time (controlled by a programmable controller not shown) in their extended positions, thereby forming a top seal 58 of the just-filled bag and a bottom seal 56 of the immediately preceding unfilled package. The temperature of sealing bar 74a is controlled by a programmable heat controller 6.

A knife 73 is incorporated in cross sealing jaw 72a, while a backing member for supporting the film during cutting is incorporated in cross sealing jaw 72b. When the cross sealing jaws are in their respective extended position, the opposing walls 10 and 12 of the film are cut as the cutting edge of knife 73 bears against the backing member with the film therebetween.

Substantially concurrently with formation of the bottom seal 56 and the top seal 58, the unsealed zipper flange 46 is attached to wall 12 of the formed bag by the sealing bar 74a, which is heated. The opposing sealing bar 74b is not heated. In the extended positions, the sealing bars 74a and 74b press the zipper flanges 44 and 46 together, and heat from the heated sealing bar 74a is conducted through the film wall 12 and into the zipper flange 46, forming a permanent seal 54 therebetween. The other zipper flange 44 has already been joined to film wall 10 by a permanent seal 52 formed at the first sealing station. The temperature of sealing bar 74a is controlled by a programmable heat controller 8.

Although the mechanical linkages are not shown, the sealing bar 74a is mechanically linked to the sealing jaw 72a, while the sealing bar 74b is mechanically linked to the sealing jaw 72b. Thus the dwell time of sealing bars 74a and 74b in their extended positions is the same as that for sealing jaws 72a and 72b However, the separate heat controllers 6 and 8 enable independent control of the temperature of the sealing jaws 72a and 72b as compared to the temperature of the sealing bar 74a. The heat controller 8 controls the temperature of the sealing bar such that the zipper flange 46 is sealed to wall 12 without sealing zipper flange 46 to zipper flange 44. Each of the heat controllers 6 and 8 operates in substantially the same manner as the heat controller, previously described, that controls the heating of sealing bar 50 at the first sealing station, to wit, each heated sealing bar incorporates a thermocouple and an electric heater, the heat controller controlling the electrical current supplied to the heater as a function of, at a minimum, the temperature reading supplied by the thermocouple and a preset temperature limit set by the system operator.

Thus, due to the mechanical linkages at the second sealing station, four operations are performed substantially concurrently: (a) the completed bag is severed from the remainder of the tubular film by the knife 73; (b) the top seal 58 is formed in the completed bag; (c) the bottom seal 56 is formed for the next bag to be completed; and (d) the zipper flange 46 is sealed to the wall 12 of the completed bag. When the sealing jaws 72a and 72b and the sealing bars 74a and 74b are retracted, the severed completed bag will proceed to the next stage.

The linked jaws 72 and bars 74 can be displaced by means of the same type of apparatus described in connection with sealing bar displacement at the first sealing station, namely, mounting the bar to a mounting plate supported by a pair of guide shafts slidable in respective bearings and then using an air cylinder to displace the mounting plate. Hydraulic cylinders can be employed in place of air, i.e., pneumatic, cylinders. A person skilled in the art of machinery design will readily appreciate that displacing means other than a cylinder can be used to vertically displace the sealing bars/jaws and the drive roller carriage. Any other known mechanical displacement means can be used. For the sake of illustration, such mechanical displacement devices include rack and pinion arrangements, rotation of the pinion being driven by an electric motor.

While the invention has been described with reference to preferred embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. For example, it should be obvious that the slider guide may be formed as a monolithic piece or may be an assembly having two or more parts. Therefore it is intended that the invention not be limited to the particular embodiment disclosed as the best mode contemplated for carrying out this invention, but that the invention will include all embodiments falling within the scope of the appended claims.

As used in the claims the terms "first portion", "second portion", and so forth (e.g., of a zipper flange or of bag making film) refer to non-identical portions, but do not exclude portions that share a common area.

What is claimed is:

1. A system for manufacturing reclosable bags comprising:
    a vertical form-fill-seal (VFFS) machine for forming, filling and sealing a reclosable bag, comprising a forming collar, a fill tube and sealing means;
    a roll of bag making film comprising a wound portion and an unwound portion, the unwound bag making film extending from said wound portion of said roll to said forming collar arid through said vertical FFS machine;
    opposing grooved elements comprising grooves designed to hold interlocked first and second closure members of a zipper assembly while first and second zipper flanges of said zipper assembly project in a forward machine direction, said first zipper flange being disposed between unwound bag making film and said second zipper flange;
    first and second sealing bars arranged in opposition at a first sealing station with said first sealing bar above said second zipper flange and said second sealing bar below the unwound bag making film;
    means for moving said first and second sealing bars between respective extended positions and respective retracted positions, said first and second zipper flanges and a first portion of unwound bag making film being pressed between said first and second sealing bars in their respective extended positions;
    first control means for heating said second sealing bar while in its extended position, said first sealing bar being unheated while in its extended position, and said second sealing bar being heated to a degree that said first zipper flange is sealed to said first portion of unwound bag making film without said first zipper flange being sealed to said second zipper flange; and
    means for advancing the bag making film with said zipper assembly attached thereto from said first sealing station to said sealing means of said VFFS machine.

2. The system as recited in claim 1, further comprising:
    third and fourth sealing bars arranged in opposition at a second sealing station, said third and fourth sealing bars being disposed below said fill tube on opposite sides of the reclosable bag;
    means for moving said third and fourth sealing bars between respective extended positions and respective retracted positions, said first and second zipper flanges, a second portion of unwound bag making film in contact with said second zipper flange, and a third portion of said unwound bag making film in contact with said first zipper flange being pressed between said third and fourth sealing bars in their respective extended positions; and
    second control means for heating said fourth sealing bar while in its extended position, said third sealing bar being unheated while in its extended position, and said fourth sealing bar being heated to a degree such that said second zipper flange is sealed to said second portion of unwound bag making film without said second zipper flange being sealed to said first zipper flange.

3. The system as recited in claim 1, wherein said opposing grooved elements comprise a shelf having a longitudinal groove and a plurality of drive rollers, each drive roller having a peripheral groove aligned with said longitudinal groove of said shelf.

4. The system as recited in claim 3, wherein said longitudinal groove of said shelf is generally parallel to said first sealing bar.

5. The system as recited in claim 3, further comprising: a carriage supporting said plurality of drive rollers; first means for retracting said carriage in a vertical direction; second means for retracting said first sealing bar in a vertical direction; and a support frame supporting said first and second retracting means.

6. The system as recited in claim 1, wherein said sealing means of said VFFS machine comprise:
    fifth and sixth sealing bars arranged in opposition and disposed below said fill tube on opposite sides of the bag and above said third and fourth sealing bars, wherein said fifth sealing bar is mechanically linked to said third sealing bar and said sixth sealing bar is mechanically linked to said fourth sealing bar; and
    third control means for heating said fifth and sixth sealing bars while in their extended positions, said fifth and sixth sealing bars being heated to a degree such that opposing walls of the bag are sealed to each other.

7. The system as recited in claim 6, wherein said sealing means of said VFFS machine further comprise:
    seventh and eighth sealing bars disposed on opposite sides of the bag below said fifth and sixth sealing bars and above said third and fourth sealing bars respectively, wherein said seventh sealing bar is mechanically linked to said fifth sealing bar and said eighth sealing bar is mechanically linked to said sixth sealing bar, said seventh and eight sealing bars being heated by said third control means; and a cutting instrument for cutting the opposing walls of the bag along a transverse line at an elevation between the elevations of said fifth and seventh sealing bars, at least a part of said cutting instrument moving with the mechanically linked sealing bars on one side of the bag.

8. An apparatus for making a zippered bag, comprising the following:

first pressing means for pressing a first portion of a web of bag making film and first and second zipper flanges of a zipper assembly together along the length of said zipper assembly, with said first zipper flange sandwiched between and in contact with said first portion of said web and said second zipper flange;

first heat control means for causing heat from said first pressing means to be conducted through said first portion of said web into said first zipper flange during pressing, the amount of heat conducted through said first portion of said web being sufficient to join said first portion of said web to said first zipper flange without joining said first zipper flange to said second zipper flange;

a fill tube;

a forming collar for wrapping said web of bag making film around said fill tube;

means for guiding a section of said web that carries said zipper assembly so that first and second marginal portions of said web confront each other adjacent said fill tube;

a pair of mutually opposing vertical sealing bars for joining at least respective portions of said first and second marginal portions together;

first and second cross sealing jaws disposed below the elevation of a lowermost point of said fill tube, said first cross sealing jaw comprising first and second cross sealing bars, and said second cross sealing jaw comprising third and fourth cross sealing bars respectively mutually opposed to said first and second cross sealing bars;

a cutting instrument for cutting said web along a transverse line at an elevation between said first and second cross sealing bars, said first and second cross sealing jaws joining respective portions of said web above and below the cut line;

second pressing means for pressing said first portion of said web, said first and second zipper flanges of said zipper assembly, and second and third portions of said web together along the length of said zipper assembly, with said second zipper flange sandwiched between and in contact with said second and third portions of said web and said first zipper flange; and second heat control means for causing heat from said second pressing means to be conducted through said second and third portions of said web into said second zipper flange during pressing, the amount of heat conducted through said second and third portions of said web being sufficient to join said second and third portions of said web to said second zipper flange without joining said second zipper flange to said first zipper flange.

9. The apparatus as recited in claim 8, wherein said first pressing means comprises a heated sealing bar and an unheated sealing bar, and said first heat control means comprises a programmable heat controller that controls the amount of heat emitted by said heated sealing bar.

10. The apparatus as recited in claim 8, wherein said second pressing means comprises a heated sealing bar and an unheated sealing bar, and said second heat control means comprises a programmable heat controller that controls the amount of heat emitted by said heated sealing bar.

11. A vertical form-fill-seal machine comprising:

a fill tube;

a forming collar partly surrounding a portion of said fill tube with a gap therebetween;

a web of bag making film having a multiplicity of zipper assemblies attached thereto at spaced intervals along a machine direction, each zipper assembly being oriented along a transverse direction, said web passing through said gap, being wrapped around said fill tube, and extending downward below said fill tube, each zipper assembly comprising first and second zipper strips, said first zipper strip comprising a first closure profile and a first zipper flange, and said second zipper strip comprising a second closure profile and a second zipper flange, said first zipper flange being joined to a first portion of said web, and said second zipper flange being not joined to said web;

means for guiding a section of said web that carries a zipper assembly so that first and second marginal portions of said web confront each other adjacent said fill tube;

a pair of mutually opposing vertical sealing bars for joining at least respective portions of said first and second marginal portions together;

first and second cross sealing jaws disposed below the elevation of a lowermost point of said fill tube, said first cross sealing jaw comprising first and second cross sealing bars, and said second cross sealing jaw comprising third and fourth cross sealing bars respectively mutually opposed to said first and second cross sealing bars;

a cutting instrument for cutting said web along a transverse line at an elevation between said first and second cross sealing bars, said first and second cross sealing jaws joining respective portions of said web above and below the cut line;

fifth and sixth cross sealing bars disposed at an elevation below said fill tube where said first and second zipper flanges of each successive zipper assembly are held stationary during each successive dwell time respectively, said fifth and sixth sealing bars being reciprocatable to press said first portion of said web, said first and second zipper flanges of said zipper assembly, and second and third portions of said web together along the length of each successive zipper assembly, with said second zipper flange sandwiched between and in contact with said second and third portions of said web and said first zipper flange, said fifth sealing bar being heated and in contact with said second and third portions of said web, and said sixth sealing bar being not heated and in contact with said first portion of said web; and a programmable heat controller programmed to cause said fifth sealing bar to emit heat in an amount sufficient to join said second and third portions of said web to said second zipper flange without joining said second zipper flange to said first zipper flange.

* * * * *